No. 768,372. PATENTED AUG. 23, 1904.
P. J. KAMPERDYK.
ELECTRIC BATTERY.
APPLICATION FILED OCT. 14, 1903.
NO MODEL.
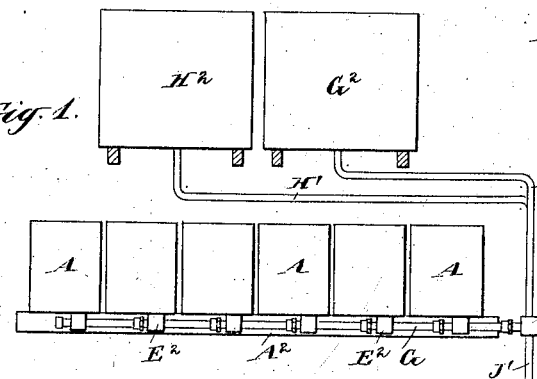
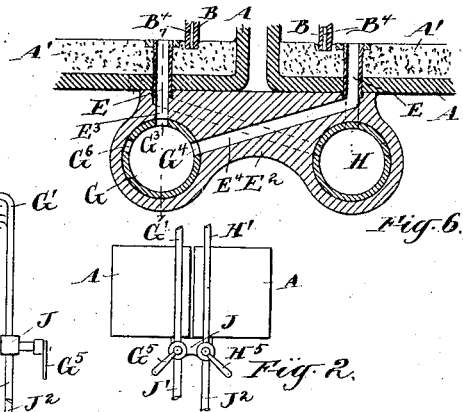
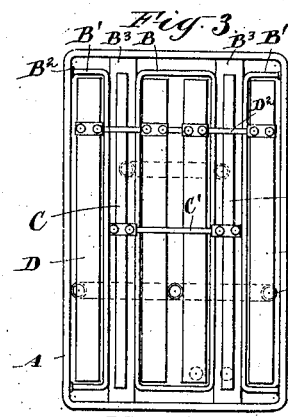
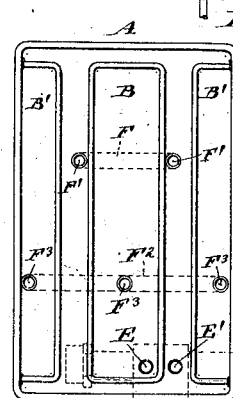
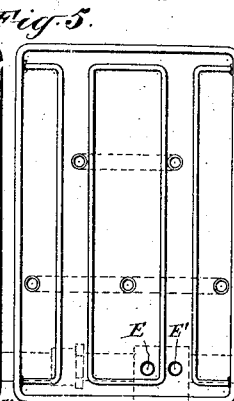
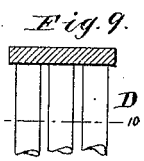
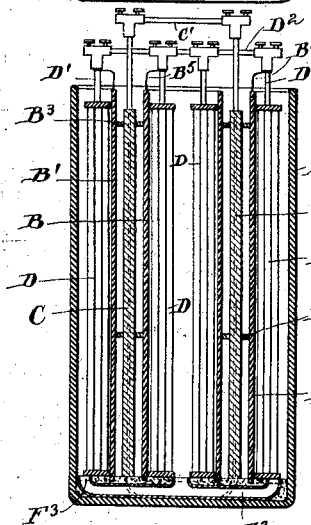
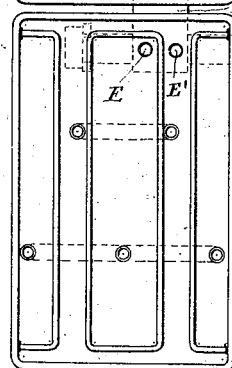
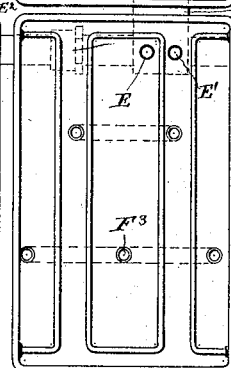
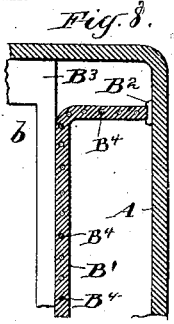
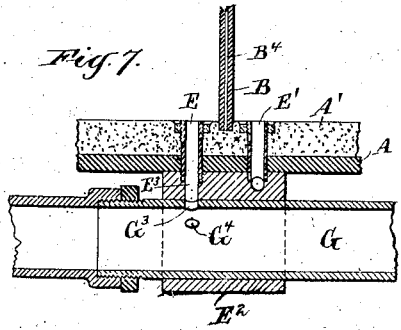
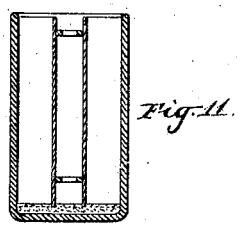
Witnesses:
M. E. Grace
W. H. Gesner
Inventor:
Pierre Joseph Kamperdyk,
By his attorney
Charles R. Searle.

No. 768,372. Patented August 23, 1904.

UNITED STATES PATENT OFFICE.

PIERRE JOSEPH KAMPERDYK, OF NEW YORK, N. Y.

ELECTRIC BATTERY.

SPECIFICATION forming part of Letters Patent No. 768,372, dated August 23, 1904.

Application filed October 14, 1903. Serial No. 177,021. (No model.)

*To all whom it may concern:*

Be it known that I, PIERRE JOSEPH KAMPERDYK, a subject of the King of Belgium, residing in the city of New York, borough of Manhattan, in the county and State of New York, have invented a certain new and useful Improvement in Electric Batteries, of which the following is a specification.

The invention relates to the construction and arrangement of parts comprising a primary cell and to the disposition and maintenance of a series of such cells.

The object of the invention is to provide a primary battery especially adapted for service in lighting, motive power, and traction, and in general in all situations where an intense current of long duration and constancy is required. This is attained in the present invention by greatly reducing the internal resistance and correspondingly reducing the range of variations in the current due to such resistance, by constructing and arranging the component parts of the cell in such manner as to obtain the maximum of efficiency, and by reducing to a minimum the labor and expense of maintaining a series of such cells constituting a battery.

The invention consists in certain details of construction and arrangements of parts to be hereinafter described.

The accompanying drawings form a part of this specification and show the invention as I have carried it out.

Figure 1 is an elevation showing the installation of a series of my improved cells, on a small scale, with their supply-reservoirs and pipe connections. Fig. 2 is a corresponding end view of a portion. Fig. 3 is a plan view of one of the cells on a larger scale, and Fig. 4 is a corresponding vertical transverse section. Fig. 5 is a plan view of four connected cells with certain portions removed, showing the pipe connections. Fig. 6 is a vertical section through two adjacent cells, showing the valve controlling the fluid charging and discharging ports on a still larger scale. Fig. 7 is a corresponding vertical section through the valve-casing, taken on the line 7 7 in the preceding figure. Fig. 8 is a horizontal section and plan of a portion of one of the cells. Fig. 9 is a vertical section and elevation of a portion of one of the positive elements, and Fig. 10 is a corresponding horizontal section on the line 10 10 in Fig. 9. Fig. 11 is a vertical section showing a modified form of cell.

Similar letters of reference indicate the same parts in all the figures.

Each cell is composed of an exterior vessel A, containing the exciting liquid, made in rectangular form of any suitable material not affected by acid.

B is a rectangular shell or receptacle, open at the ends and set longitudinally of the vessel A in the center thereof, held in place by forcing the lower open end into a layer $A'$ of softened asphalt, bitumen, rubber, or other suitable cement, covering the interior bottom of the vessel to a slight depth and subsequently allowed to harden, and $B'$ $B'$ are shells having their lower edges similarly embedded in the layer $A'$, but differing from the central shell B in that one side wall is omitted, the open side thus formed lying close against the interior side wall of the vessel, the joint being sealed by the interposition of soft-rubber strips $B^2$ and held firmly in place by the distance-pieces or braces $B^3$, forced between the central shell B and side shells $B'$. The shells B $B'$ $B'$ perform the functions of porous cups and contain the carbon electrodes.

Embedded in the layer $A'$ is a pipe F, having upturned ends $F'$ $F'$ opening in the spaces between the shells, and $F^2$ is a pipe or passage similarly held, having three openings $F^3$ $F^3$ $F^3$ communicating each with the interior of one of the shells or porous cups and permitting the flow of liquid from one to another.

The cups or shells may be of any porous material, as unglazed earthenware, asbestos, parchment-paper, or hardened collodion. I prefer, however, to make them of carbon and to connect them to the positive-pole elements or electrodes, and thus increase the surface of the positive pole of the battery.

The negative-pole electrodes for each cell are shown as zinc plates C, having the proper superficial area proportional to the output of the cell. Each plate C is located between adjacent porous cups and received in openings $b$ in the distance-pieces $B^3$ and are both connected by a wire $C'$.

A positive-pole electrode D, contained in each cup B B' B', is presented to each face of each zinc plate and is shown as composed of groups of small carbon pencils secured at their ends to metal plates and arranged in parallel rows with very narrow openings between adjacent pencils, but sufficient to allow the depolarizing liquid in which the pencils D are submerged to circulate freely. The rows are arranged in lines parallel with and close to the adjacent walls of the cups. Two carbon electrodes D are placed in the larger central cup B and one in each of the smaller or half cups B' B'.

The series of cells comprising the battery is installed as indicated in Fig. 1, in which the cells are shown as supported in two parallel rows on beams $A^2$. The cells in each row are provided with short tubes or thimbles E E', extending through the layer A' and bottom of the vessel A. The tube E' enters the space between B and B', and the tube E enters the central cup B. The tube E serves to fill and drain all the cups through their connecting-pipe $F^2$ and the tube E' to fill and drain the vessel A, as required. The adjacent cell in the other row is similarly equipped, and the tubes of each are received in a double valve-casing $E^2$. Two line-pipes G and H extend through all the casings $E^2$, running parallel with the rows, and serve as filling and draining pipes and also by a peculiar arrangement of ports, as valves, controlling the tubes E and E'. The pipe G supplies the depolarizing liquid from an elevated reservoir $G^2$ to the porous cups of both rows and the pipe H the exciting liquid from an elevated reservoir $H^2$ to the vessels A in both rows. The valve-casings are each provided with ports $E^3$ $E^4$, leading from the tubes E in the adjacent vessels, and match to ports $G^3$ $G^4$ in the pipe G (see Figs. 6 and 7) when the latter is turned by the handle $G^5$ to the position shown in Fig. 6, and the line-pipe H is similarly provided with ports matching to passages from the tubes E'. J is a three-way-valve casing receiving pipes G' and H', leading, respectively, from the reservoirs $G^2$ $H^2$ and equipped with discharge-pipes J' $J^2$, leading to a waste-pipe or drain (not shown) and also provided with ports matching to corresponding ports in the line-pipes G and H, so arranged that when the latter—as G, for instance—is turned in one direction by the handle $G^5$ the ports $E^3$ and $E^4$ will coincide with the ports $G^3$ $G^4$ and permit depolarizing liquid from the reservoir $G^2$ to flow into the cups B B' in all the vessels A in both rows and when turned fully in the opposite direction to bring the ports $G^6$ and $G^3$ into operative relation with the ports $E^3$ $E^4$ and at the same time shut off the supply in the three-way-valve casing from the reservoir $G^2$ and open communication with the drain through the pipe J' and run off the exhausted depolarizing liquid. The pipe H may be similarly turned by the handle $H^5$ to supply exciting liquid from the reservoir $H^2$ through the pipe H' to the several vessels throughout the series or to empty them through the pipe $J^2$. When the handle $G^5$ or $H^5$ is moved to an intermediate position, the line-pipes G and H will be turned to shut off both the supply and discharge and also to isolate each cell.

Besides serving to fill and empty the cups, as above described, by permitting the flow of liquid from one cup to the others in the cell the pipe $F^2$ performs the important function of allowing free circulation of the depolarizing liquid through all the cups, thus insuring uniformity of reaction throughout the cell. The pipe F serves similarly to afford means for the exciting liquid to circulate and maintain a uniform density in all parts of the vessel A.

The construction and arrangement shown permits the cell to be of relatively small dimensions without loss of efficiency, a factor of importance in situations where great energy is desired and space is limited.

By placing the zinc plates close to the exterior walls of the porous cups and the carbons close to the interior walls the internal resistance of the cell is greatly reduced, correspondingly increasing the ratio of efficiency and also confining the degree of fluctuations in the current within narrow limits.

The carbon electrodes are shown as composed of pencils containing a wire of incorrodible metal or coated with a material of great conductivity, coated with a material not attacked by acids, serving to strengthen the pencils and increase their conductivity. The plates to which the upper ends of the rows are attached are joined by wires D' D' to a wire $D^2$, forming the positive pole of the cell. The carbon cups B B' B' are also preferably constructed with a series of vertically-arranged wires $B^4$, similar to those in the pencils and serving to strengthen the thin walls of the cups. The latter are connected by wires $B^5$ to the positive pole, thus serving to increase the carbon surface of the cell and allowing the zinc plates to stand in very close proximity to the carbon elements. The distance-pieces $B^3$ serving to hold the cups in place also serve the additional function of very exactly locating the positions of the zinc plates relatively to the cups and prevents contact with the latter, while allowing the plates to stand as closely thereto as the required circulation of the exciting liquid will permit.

Modifications may be made in the forms and proportions without departing from the invention or sacrificing its advantages. The wires $B^4$ may be omitted from the porous cups, and other forms of carbon electrodes may be used. The pipes connecting the porous cups may be varied, as may be the provisions for filling and emptying the cups and vessels. The layer A' of asphalt or bitumen may be omitted, and the cups may be of any usual or approved form connected by communicating pipes attached in any suitable manner.

Fig. 11 shows a cell in which the central cup is omitted, the side cups being held by distance-pieces, as before, and a single zinc plate held between them. This form may be preferred in small cells.

A single row of cells may be employed, the line-pipes and valve-casings being arranged to correspond, as will be understood.

I claim—

1. In a primary battery, a cell comprising a containing vessel, two or more porous cups therein, and passages connecting said cups to allow the liquid therein to flow freely from one to the other to insure equal density in each.

2. In a primary battery, two or more cells each comprising a containing vessel having two or more porous cups therein, passages connecting the cups of each cell to allow the liquid therein to flow freely from one cup to the other to insure equal density of said liquid in all the cups of such cell, a pipe serving as a conduit for all the cells, a passage from one of the porous cups in each cell to said pipe, and means for closing said pipe between each cell and the next.

3. A series of primary cells each comprising a containing vessel having a discharge-pipe, one or more porous cups in each vessel, a discharge-pipe from said cups through said vessel, a line-pipe receiving the discharge-pipes from the several vessels in the series, a line-pipe receiving the discharge-pipes from the several cups, reservoirs containing supplies of liquid for said vessels and cups, a three-way valve in each of said line-pipes, and connections from said three-way valves to a waste-pipe, and connections from said reservoirs to said three-way valves, whereby the liquid contents of said vessels and cups may be discharged through said three-way valves when the latter are in one position, and liquids from said reservoirs allowed to flow to said vessels and cups when said three-way valves are in another position.

4. A series of primary cells each comprising a containing vessel having a discharge-pipe, two or more porous cups in each vessel, passages connecting the cups in each vessel, a discharge-pipe from one of said cups, a line-pipe receiving the discharge from each vessel and means for controlling such discharge, and a line-pipe receiving the discharge from the cups in all the vessels and means for controlling such discharge, whereby the liquid contents of all the vessels and all the cups may be discharged.

5. In a primary cell, a containing vessel, one or more porous cups therein composed of carbon, zinc plates and connections between them to form the negative pole, one or more carbon electrodes and connections between them to form the positive pole, and connections from said cups to said positive pole, whereby said cups serve as additional positive-pole electrodes.

6. In a primary battery, a containing vessel, a layer of cement or analogous material in the bottom thereof, a plurality of porous cups each comprising an open shell, closed at the lower end and held in place by being partially embedded in said layer, and passages connecting said cups.

7. In a primary battery, a containing vessel, a layer of cement or analogous material in the bottom thereof, a series of porous cups each comprising an open shell, closed at the lower end and secured in place by being partially embedded in said layer, and passages connecting said cups formed by pipes inclosed in said layer and opening to the interior of said shells.

8. In a primary battery, a containing vessel, two porous cups therein, each comprising a shell open at the ends and having its wall omitted next the adjacent wall of said vessel, and distance-pieces between said cups serving to hold the latter in place and against the walls of said vessel.

9. In a primary battery, a containing vessel, a porous cup centrally located in said vessel, a porous cup on each side thereof each having its side wall omitted next the adjacent wall of said vessel, distance-pieces between said cups serving to hold the latter in place and against the walls of said vessel.

10. In a primary battery, a containing vessel, a porous cup centrally located in said vessel, a porous cup on each side thereof, each having its wall omitted next the adjacent wall of said vessel, distance-pieces between said cups serving to hold the latter in place and against the walls of said vessel, the said distance-pieces having apertures adapted to receive and hold an electrode.

11. In a battery, a series of cells arranged in a row, a series of valve-casings, one for each cell, line-pipes extending along said row and passing through said valve-casings and arranged to turn therein, ports in said valve-casings leading from said cells to said line-pipes, and ports in the latter matching thereto, whereby said pipes serve as filling and emptying conduits for said cells and also as valves controlling said ports.

12. In a battery, two series of cells arranged in parallel rows, a series of valve-casings each connecting a cell in one row to the adjacent cell in the other row, a line-pipe for each row extending through said casings and arranged to turn therein, ports in said casings leading from said cells to said pipes, and ports in the latter matching thereto, whereby said pipes serve the double function of filling and emptying pipes for said cells and also as valves controlling said casing-ports.

13. In a battery, two series of cells arranged in parallel rows, one or more cups in each of said cells, a series of valve-casings each connecting a cell in one row to the adjacent cell in the other row, a line-pipe for each row extending through said casings and arranged to turn therein, ports in said casings leading from the interior of said cells to one of said pipes, and ports in said casings leading from the interior of said cups to the other of said pipes, and ports in said pipes matching to said casing-ports, whereby one of said line-pipes serves as a filling and emptying conduit for liquid supplied to said cells, and the other of said line-pipes serves as a filling and emptying conduit for liquid supplied to said cups, and both line-pipes serve as valves for controlling said casing-ports.

In testimony that I claim the invention above set forth I affix my signature in presence of two witnesses.

PIERRE JOSEPH KAMPERDYK.

Witnesses:
T. DARDANS,
CHARLES R. SEARLE.